United States Patent
Yanamadala et al.

(10) Patent No.: US 11,082,202 B2
(45) Date of Patent: Aug. 3, 2021

(54) FAULT INJECTION ATTACK DETECTION IN INTEGRATED CIRCUITS

(71) Applicant: Arm Limited, Cambridge (GB)

(72) Inventors: Subbayya Chowdary Yanamadala, Dallas, TX (US); Mikael Yves Marie Rien, Bernin (FR); Anish Dhanekula, Hyderabad (IN); Roma Rudra, Bangalore (IN)

(73) Assignee: ARM LIMITED, Cambridge (GB)

( * ) Notice: Subject to any disclaimer, the term of this patent is extended or adjusted under 35 U.S.C. 154(b) by 291 days.

(21) Appl. No.: 15/996,134

(22) Filed: Jun. 1, 2018

(65) Prior Publication Data

US 2019/0372751 A1 Dec. 5, 2019

(51) Int. Cl.
*H04L 29/06* (2006.01)
*H04L 9/00* (2006.01)
*G06F 21/75* (2013.01)
*H01L 23/00* (2006.01)

(52) U.S. Cl.
CPC ............. *H04L 9/004* (2013.01); *G06F 21/75* (2013.01); *H01L 23/576* (2013.01)

(58) Field of Classification Search
CPC ........ H04L 9/004; H04L 9/003; G06F 21/755
See application file for complete search history.

(56) References Cited

U.S. PATENT DOCUMENTS

| 9,313,027 | B2 | 4/2016 | Modave et al. | |
|---|---|---|---|---|
| 2012/0320477 | A1* | 12/2012 | Lisart | H01L 23/576 361/78 |
| 2015/0369865 | A1* | 12/2015 | Hershman | H03K 19/003 326/8 |
| 2017/0115359 | A1* | 4/2017 | Leduc | G01R 31/40 |
| 2018/0232542 | A1* | 8/2018 | Martin | H01L 23/576 |
| 2018/0349600 | A1* | 12/2018 | Elenes | G06F 21/77 |

OTHER PUBLICATIONS

Koeune, Francois and Standaert, Francois-Xavier, "A Tutorial on Physical Security and Side-Channel Attacks," JCL Crypto Group, 33 pages, Place du Levant, 3. 1348 Louvain-la-Neuve, Belgium.
Hutter, et al. "Test Apparatus for Side-Channel Resistance Compliance Testing," Institute for Applied Information Processing and Communications (IAIK), Graz University of Technology, 14 pages, Graz, Austria.
International Search Report and Written Opinion Issued in International Application No. PCT/GB2019/051164, dated Jul. 4, 2019, 12 pages.

* cited by examiner

*Primary Examiner* — Jason K Gee
(74) *Attorney, Agent, or Firm* — Talem IP Law, LLP

(57) ABSTRACT

A system with fault injection attack detection can include a circuit block; at least one independent power network; a detector coupled to the at least one independent power network to detect a change in a power characteristic of the independent power network; and sensors coupled to the at least one independent power network and located in an active layer of a chip with the circuit block. The sensors are responsive to at least one type of fault injection attack. In some cases, the sensors can be inverters.

12 Claims, 7 Drawing Sheets

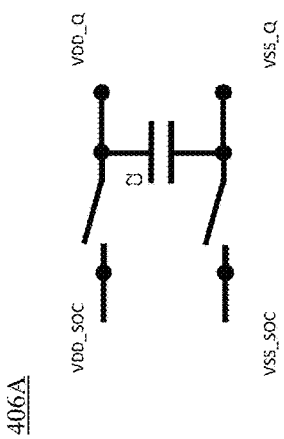
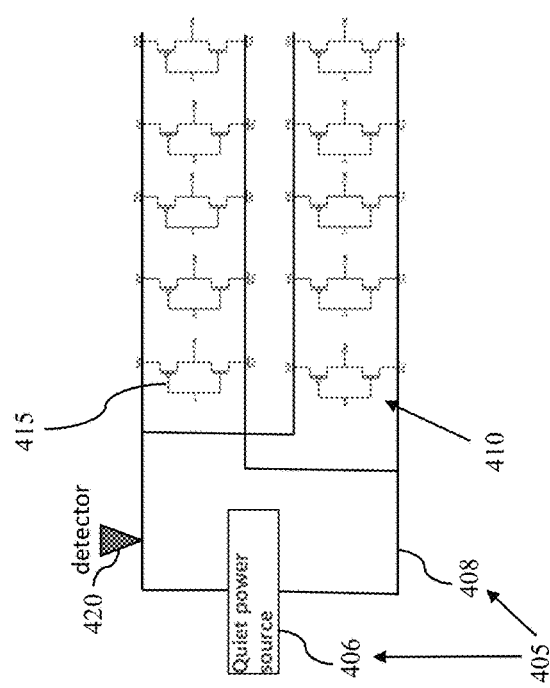
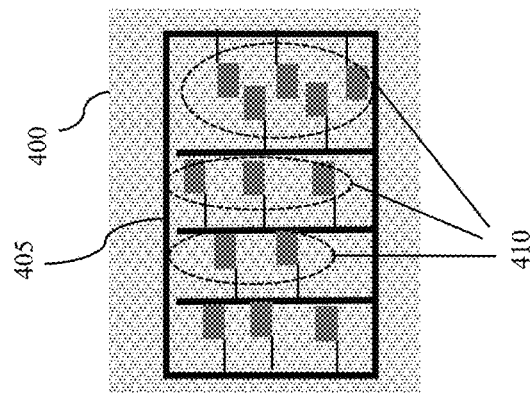
FIGURE 4C
FIGURE 4B
FIGURE 4A

FAULT INJECTION ATTACK DETECTION IN INTEGRATED CIRCUITS

BACKGROUND

Integrated circuits (ICs) may include designs that contain sensitive information. An example of such sensitive information is the secret key information used in crypto engine implementations (such as AES). Attempts to access secure or sensitive information (cryptographic or otherwise) on an IC may be carried out via unauthorized or unintended access methods for the circuit. Such methods include fault injection attacks, where an adversary injects something in the circuit to alter the behavior of the circuit. Fault injection attacks include optical glitching, electromagnetic fault injection, and body bias injection.

BRIEF SUMMARY

Fault injection attack detection in integrated circuits is described herein. The described fault injection attack detection and corresponding circuitry can identify elevated power characteristics on an independent power network to detect a fault injection attack.

An implementation of a system incorporating fault injection attack detection can include a circuit block, at least one independent power network not supplying power to the circuit block, a detector coupled to the independent power network to detect a change in the power characteristics of the independent power network, and sensors coupled to the independent power network and located on active layer with the circuit block. The independent power network can include a quiet power supply. In some cases, multiple independent power networks may be provided with a corresponding detector or coupled to a same detector. The sensors can include one or more transistors or other devices that may respond to a fault injection attack. In some cases, at least one of the sensors is an inverter.

The sensors can be distributed throughout the circuit block and/or located between sub-circuits of the circuit block. Density and placement of sensors can be based on desired amount of protection or expected attack area. In some cases, placement of sensors may be automated as part of an automated place and route tool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4C shows an example implementation of a fault injection attack detection circuit.

DETAILED DESCRIPTION

Fault injection attack detection in integrated circuits is described herein. The described fault injection attack detection and corresponding circuitry can protect secure or sensitive information that might be contained on an IC by identifying elevated power characteristics on an independent power network.

As mentioned above, a fault injection attack is a common method to induce unauthorized or unintended behaviors in a circuit. Various implementations of the described circuitry can detect one or more types of fault injection attacks including, but not limited to, optical fault injection ("optical glitching"), electromagnetic fault injection (EMFI), and body bias injection (BBI).

Figure 1B:
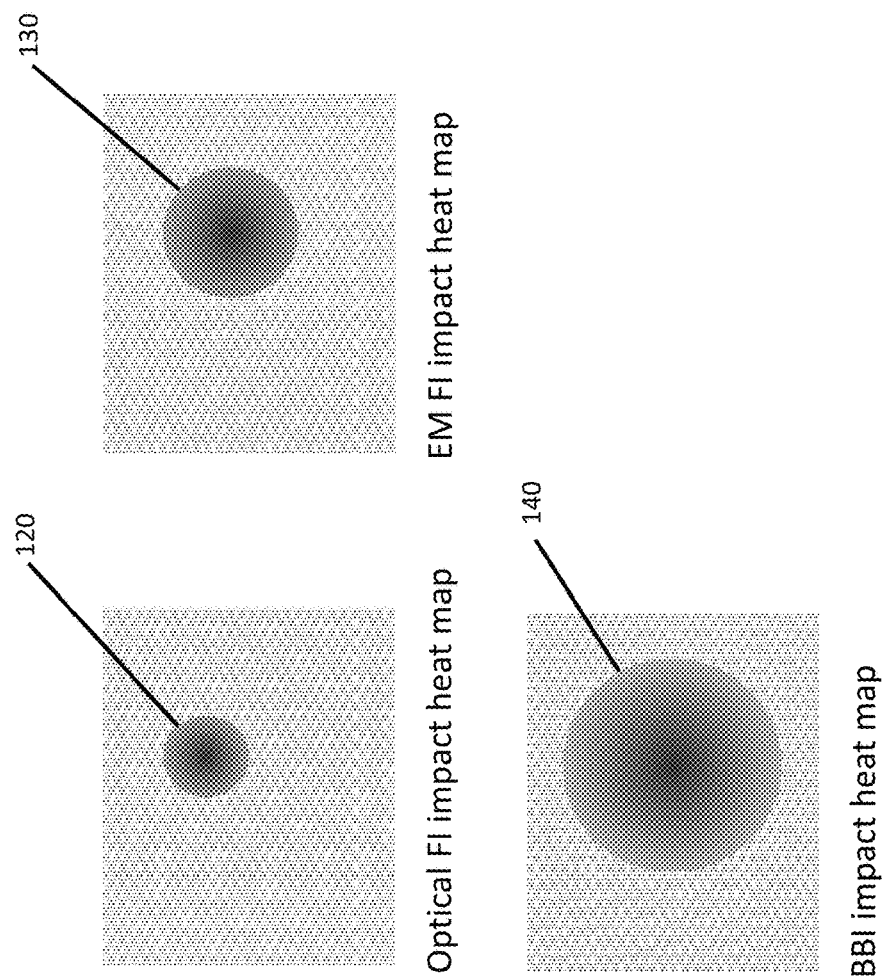
FIG. 1B shows example of heat maps representing impact area of a variety of fault injection attacks that may be made against an IC such as shown in FIG. 1A.
Figure 1A:
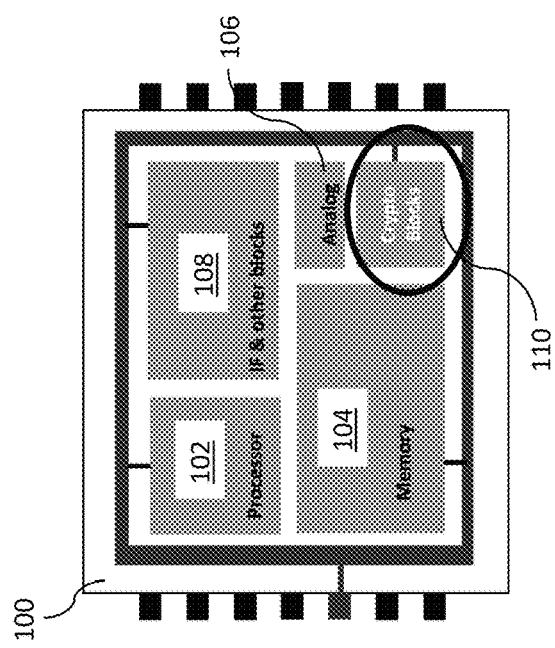
FIG. 1A shows a simplified view of an IC with various circuit blocks.

FIG. 1A shows a simplified view of an IC with various blocks. Referring to FIG. 1A, a chip 100 implementing an IC can include a plurality of different circuit blocks and sub-blocks, including, but not limited to, a processor 102, memory 104, analog circuitry 106, interface circuitry and other blocks 108, and a cryptographic block 110. The cryptographic block 110 often is or includes an area of where hackers attempt to create a glitch ("area of preferred glitches"). It should be understood that although a single block is shown as having an area of preferred glitches, a chip 100 may have multiple areas of preferred glitches that can exist within the IC. In addition, in some cases, the area of preferred glitches may be part of one of the other blocks (e.g., in the processor 102, memory 104, or other blocks). The sub-blocks of an IC circuit block may thus be considered to fall into one of at least two categories: an area where high protection is desired and an area where low(er) protection is desired (of course other gradations of coverage can be expected). Generally, the area where high protection is desired includes a cryptographic block 110 with secure or sensitive information and the area where low(er) protection is required includes typical sub-blocks such as processor 102, memory 104, analog circuitry 106, and interface circuitry and other blocks 108.

FIG. 1B shows examples of heat maps representing impact area of a variety of fault injection attacks that may be made against an IC such as shown in FIG. 1A. Referring to FIG. 1B, three heat maps covering a same target area of preferred glitches, one heat map for optical fault injection 120, one heat map for electromagnetic fault injection 130, and one heat map for BBI fault injection 140. As reflected in the heat map for optical fault injection 120, when a laser ray hits a portion of the area of the glitches, the light of the laser scatters (including due to the metal in the chip). Where the direct laser ray hits, the highest impact of the highest energy is delivered to that particular gate or point in the circuit; however, the scattering generates an impact of varying intensity (which may or may not be equally spread about the impact point). As reflected in the heat map for electromagnetic fault injection 130, electromagnetic variation is induced onto the chip, which has a wider area of impact as compared to the optical fault injection. Further, as reflected in the heat map for BBI fault injection 140, when voltage is being induced on the back side of the substrate of the chip itself, the largest area of impact can be seen.

Figure 2:
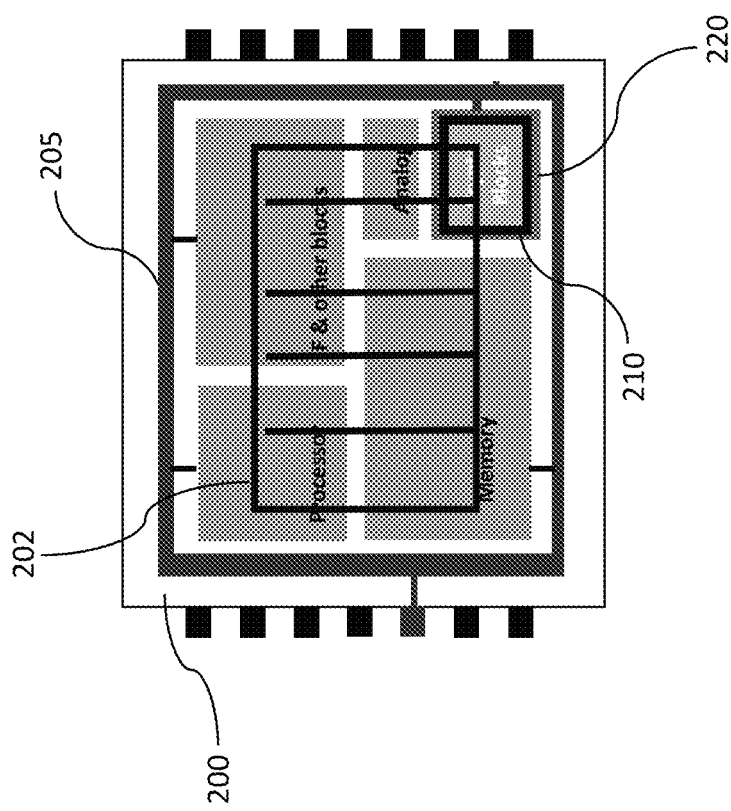
FIG. 2 shows an example of an IC with an independent power network for fault injection attack detection.

FIG. 2 shows an example of an IC with an independent power network for fault injection attack detection. Referring to FIG. 2, at least one independent power network 202 can be implemented on a chip 200 such as described with respect to chip 100 of FIG. 1A. A power network, such as independent power network 202, includes powerlines (e.g., voltage source line and a first voltage line) and an internal or separate power source (not shown). In some cases, the independent power network 202 can be external to the chip. In some cases, the independent power network 202 can be derived from an internal supply.

The independent power network 202 does not supply power to the circuits of the IC. Rather, the IC receives power from, for example, a general power network coupled to a power frame 205. In addition, in some cases, the cryptographic block 210 can receive power from its own secure power ring 220. It should be noted, however, that in some cases, the independent power network 202 may be configured such that the independent power network could nominally supply power to a circuit block (but such a configuration would take into consideration the sensitivity of the detector and/or timing of when detection occurs).

The independent power network 202 can be configured so that it normally has very low power activity. In some cases, the power source of the independent power network 202 can be a "quiet" power source. Then, a fault injection attack can be detected from the independent power network 202, for example, by an abnormal spike in the power activity (e.g., change in power signature).

Figure 3:
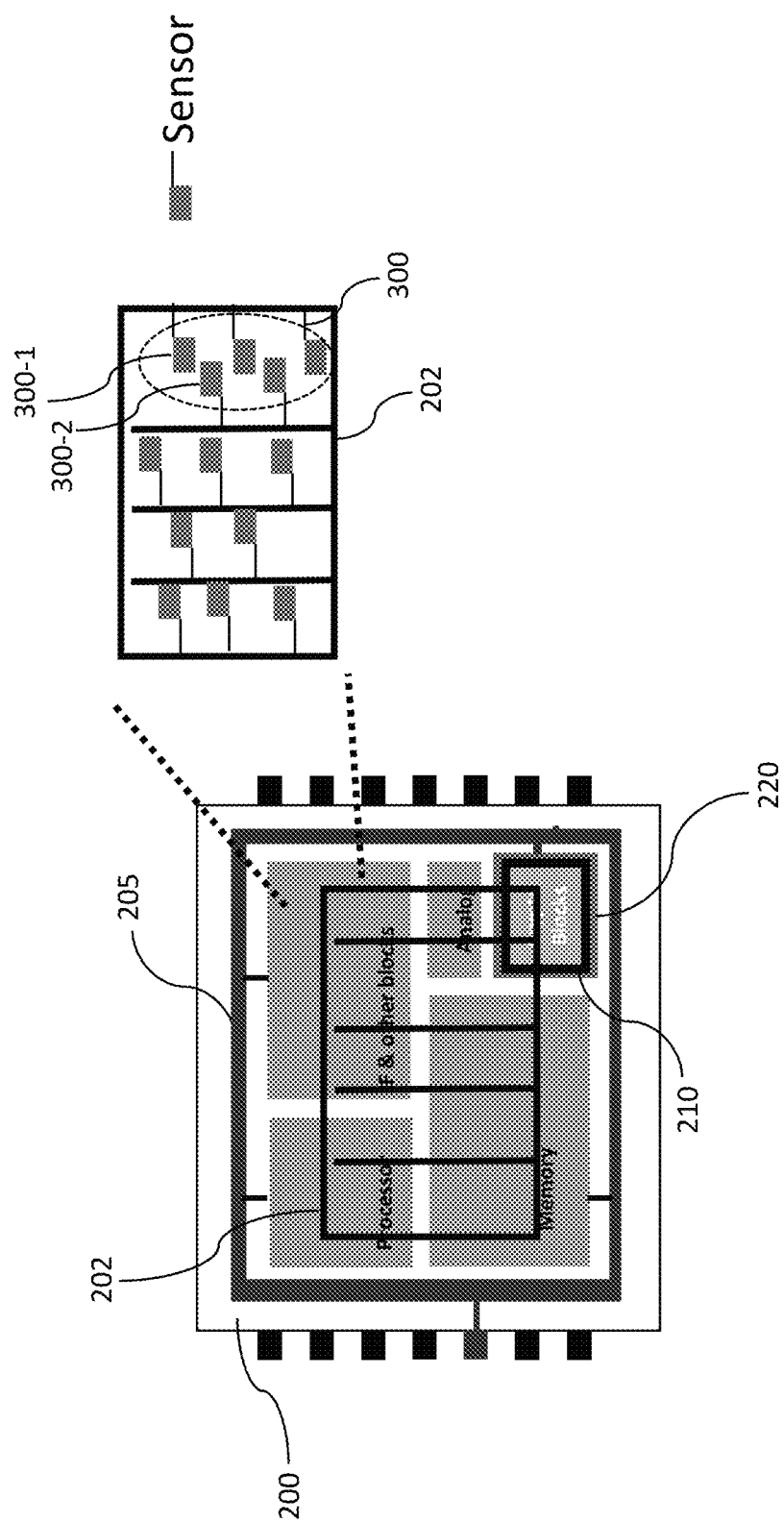
FIG. 3 shows an example implementation of an IC with an independent power network that shows attached sensors for fault injection attack detection.

FIG. 3 shows an example implementation of an IC with an independent power network that shows attached sensors for fault injection attack detection. An array of sensors 300 can be coupled to the independent power network 202 and placed along the surface of the chip (e.g., active device area), for example, concentrated in the areas of known or expected preferred glitches (e.g., located at or concentrated near cryptographic block 210). The independent power network 202 and array of sensors 300 can be spread across all the areas of high protection desired. In some cases, the independent power network 202 can be in the form of a mesh. A sensor element (e.g., 300-1, 300-2) used as part of the array of sensors 300 can include one or more transistors, diodes, capacitors, resistors, or combinations thereof. In some cases, one sensor (e.g., sensor 300-1) of the sensor array 300 may be different than another sensor (e.g., sensor 300-2) of the sensor array 300. In addition, in some cases, at least some of the sensors may be coupled to each other by a signal path (e.g., an output of one sensor may be coupled to an input of another sensor, creating a chain).

Some components for sensors are more suitable for being affected by certain of the fault injection attacks than others. For example, some capacitors and some resistors may be affected by an electromagnetic injection attack, but may not be affected by optical injection attacks. However, when the sensors are formed of transistors or diodes (and some types of capacitors and resistors), they can be affected by optical, electromagnetic, and body bias attacks. The configurations for the sensors can be selected such that the sensors respond to (e.g., have sensitivity to) at least two types of fault injection attacks. Indeed, at least two different fault injection attacks may be detected from the same sensor element.

The particular sensor components used for a sensor can be selected to be sensitive to the desired injection attack types, to have a very low power activity (e.g., static current consumption) during "normal" state, to have significant power activity during "exposed" (e.g., to an injection attack) state when compared to the "normal" state", or a combination thereof.

FIGS. 4A-4C shows an example implementation of a fault injection attack detection circuit. Referring to FIGS. 4A and 4B, sensors 410 of an independent power network 405 covering a region 400 of a chip can be inverters 415 coupled to power lines 408 of the independent power network 405. The independent power network 405 can include a quiet power source 406 and the power lines 408, which can include a voltage source line (e.g., VDD) and a first voltage line (e.g., VSS). A detector 420 can be coupled to the quiet power source 406 to detect a change of a power characteristic. The detector 420 itself may operate or be powered using the general power network (and thus be on a system power line).

In some cases, the difference in the power activity (in form and amplitude) of the sensor components when in "normal" state and "exposed" state can be utilized by the detector 420. In some cases, the detector 420 can include a current sensor. In some cases, the detector 420 can include a power sensor. In some cases, the detector 420 include a voltage sensor. In some cases, the detection can be based on a value of the current or a value of the voltage on the line (or charge storage device). In some cases, a detector can be provided that detects a value of an inverter output (from a single inverter or a chain of inverters). In some cases, multiple detectors may be included, for example, of different types and/or at multiple locations on a power line. In some cases, at least one detector can be coupled to the voltage source line and at least one detector can be coupled to the first voltage line.

The quiet power source 406 can be considered "quiet" by only connecting to sensors, not regular logic (or at least not be connected to regular logic during a time of interest or only nominally coupled to regular logic); and by being isolated from a general power supply by, for example, using a switch capacitor or a regulator (e.g., a low power regulator) or other isolation mechanism. The quiet power source 406 may be powered by an external supply or generated on-chip.

As shown in FIG. 4C, in some cases, the quiet power source 406 can be a selectively rechargeable charge storage device 406A that provides a quiet voltage source line VDD_Q and a quiet first voltage line VSS_Q by selective connection of a charge storage device C2 to a system voltage source line VDD_SOC and a system first voltage line VSS_SOC.

The implementation shown in FIG. 4C may also be considered as having two quiet power supplies: one as the voltage source line VDD_Q and the other as the first voltage line VSS_Q. In some cases, only the voltage source line or only the first voltage line could be needed.

The power consumption of the independent power network is essentially the leakage current of the sensors during the normal state. The leakage current is generally very low. The inputs/outputs of the inverters are static and deterministic. However, when one of the sensors is exposed to external disturbance that caused by fault injection attacks, the power activity spikes severely depending on the impact of the exposure. One or more inverters can change the output states during the exposure. The detection mechanism relies on this exaggerated power activity and/or changed logic states due to exposure to disturbances.

Figure 5:
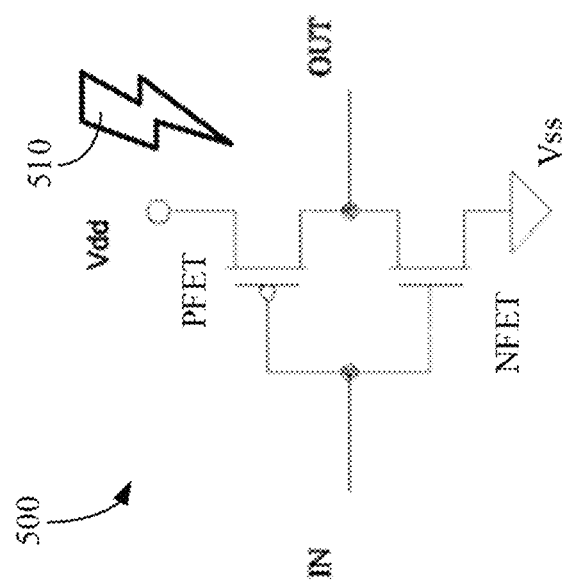
FIG. 5 shows a representation of an example sensor for a fault injection attack

FIG. 5 shows a representation of an example sensor for a fault injection attack. Referring to FIG. 1, a sensor element 500 in an IC may be an inverter with a P-type field effect transistor (PFET) coupled to a voltage source line (e.g., VDD) of an independent power supply and a N-type field effect transistor (NFET) coupled to a first voltage line (e.g., VSS, GND) of the independent power supply. It should be understood that an inverter is just one example of a sensor element that may be used in fault injection attacks. For transistor-based sensor elements, a single transistor to even several gates may form a single sensor element. The change in the power signature, for example seen as an increase of power dissipation, on the voltage source line or the first voltage line can be used to detect the presence of a fault injection attack.

For an optical glitching attack, a light or laser may be applied to an area of the IC with the intent to put a transistor into a conduction state that was "OFF". In addition to this intent, an attacker may use optical glitching to influence analog behavior to impact performance or outcome of computing (e.g., math functions). Often the NFETs are turned ON due to optical activity and the PFETs' threshold voltage is lowered (reducing voltage required to conduct current from source to drain). Other effects can also occur. The existence of the sensor element 500 within an area that can be affected by the applied light can result in the sensor element 500 being affected by the optical glitching attack. For example, if IN of the inverter element 100 is input with a value representing a 0, the NFET is turned "OFF", the PFET is turned "ON", and the output OUT is a value representing a 1. However, an optical glitching attack (e.g., represented by 510), may be performed to put the NFET into a conduction state, which would turn the NFET "ON" (or partially "ON"), which could cause the output OUT to be a 0 instead of the proper 1. The optical glitching attack may be detected using the inverter as the attack sensing element 500 and detecting an increase of power dissipation on a power supply line (e.g., VDD) of the independent power supply due to both the NFET and the PFET being "ON".

For an electromagnetic fault injection (EMFI) attack, a probe coil applies an amplified signal from a signal generator to, for example, emit a signal that can modify the voltage on the wires (e.g., a signal line) to influence execution of instructions. The existence of the sensor element 500 within an area that can be affected by the EM signal can result in the sensor element 500 being affected by the EMFI attack. For example, if IN of the inverter element 100 is input with a value representing a 1, the NFET is turned "ON", the PFET is turned "OFF", and the output OUT is a value representing a 0. However, an EMFI attack (e.g., represented by 510), may be performed that results in a modification to the inverter's net output OUT to be a 1 instead of the proper 0. The EMFI attack may be detected using the inverter as the attack sensing element 500 and detecting an increase of power dissipation on a power supply line (e.g., VDD) of the independent power supply due to both the NFET and the PFET being "ON".

For a body bias injection (BBI) attack, the voltage of a circuit's substrate is modified (e.g., a high voltage pulse is applied) in order to modify the electrical characteristics of the transistors. The existence of the sensor element 500 within an area that can be affected by the applied body voltage can result in the sensor element 500 being affected by the BBI attack. For example, if IN of the inverter element 100 is input with a value representing a 0, the NFET is turned "OFF", the PFET is turned "ON", and the output OUT is a value representing a 1. However, a BBI attack (application not shown), may be performed that affects the NFET to cause the net output OUT to be a 0 instead of the proper 1. The BBI attack may be detected using the inverter as the attack sensing element 500 and detecting an increase of power dissipation on a power supply line (e.g., VDD) of the independent power supply due to both the NFET and the PFET being "ON".

In some cases, the change in state of the inverter-based sensor can be detected to indicate presence of a fault injection attack.

Figure 6:
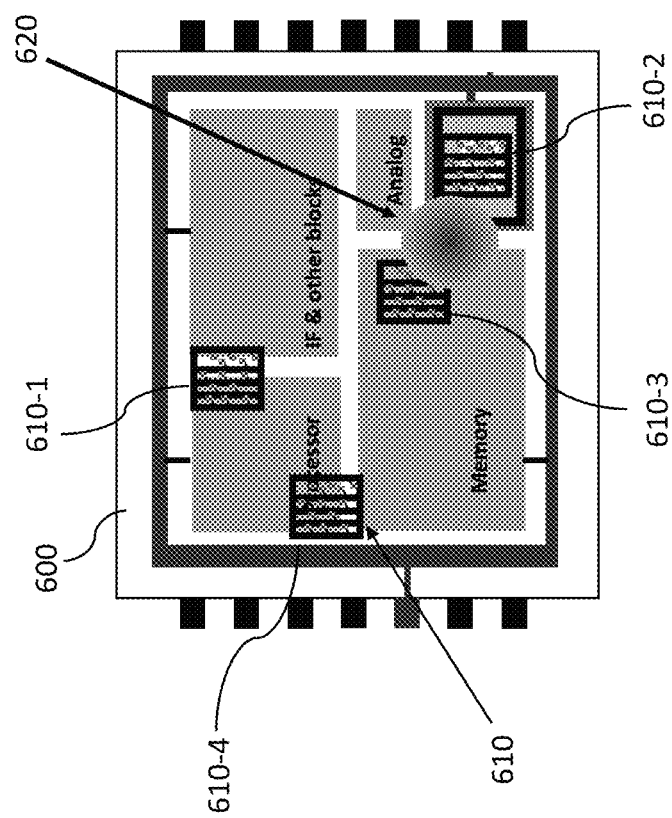
FIG. 6 shows an example of an IC with multiple independent power networks.

FIG. 6 shows an example of an IC with multiple independent power networks. Referring to FIG. 6, a system 600 can include multiple independent power networks 610, which may operate autonomously. In some cases, each independent power network (e.g., 610-1, 610-2, 610-3, 610-4) can generate a signal that can set an alarm when the detector senses malicious energy (e.g., from injection attack 620). The multiple independent power networks 610 can have overlapping areas of coverage that make sure that malicious energy can be sensed even in a case when an adversary disables one or more independent power networks. Also, multiple independent power network 610 can collaborate to detect malicious activity/energy. For example, if the energy levels detected by one independent power network can be checked against the energy levels detected by another independent power network in order to improve the probability of the detection of malicious activity.

Figure 7:
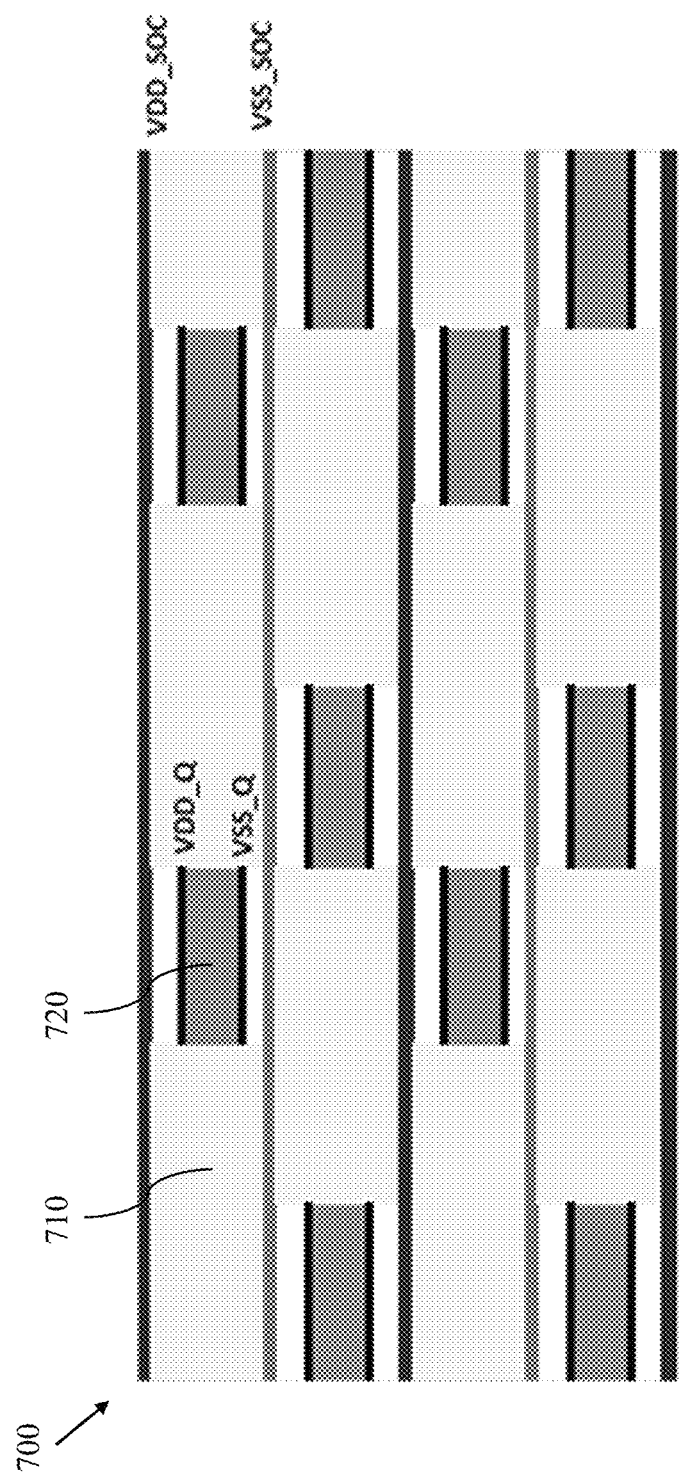
FIG. 7 shows an example of placement and routing of sensors that are attached to an independent power network.

FIG. 7 shows an example of placement and routing of sensors that are attached to an independent power network. The design process for electronic circuits includes a step for placement of circuit elements and routing of wires and interconnections. This can be carried out at the chip level—for integrated circuits or a field programmable gate array—or at a circuit board level—for printed circuit boards or other circuit packages. Electronic design automation (EDA) tools, such as available through Cadence Design Systems, Inc. and Synopsys, Inc., are used during the place and route stage to optimize arrangements and enable increased complexity in design (as compared to manual layout).

The physical design stage of an integrated circuit design process generally includes logic synthesis, floor planning, power planning, placement, clock tree synthesis, routing, verification, and "tapeout" (export of data in form for manufacturing). These stages may be carried out using associated tools that may individually or together form an EDA tool. For example, in one EDA tool with automatic place and route (APR) software, a gate-level netlist, which may be obtained from a logic synthesis tool (as part of the logic synthesis stage), is physically implemented in a layout by placing standard-cell layout (placement stage) and then auto-routing cells (routing stage) based on the connections inferred from the netlist. Where the APR software is separate from that used in the subsequent stages, the routed design can be exported from the APR tool in a format that can be understood by post analysis tools such as extraction or power analysis tools.

Referring to FIG. 7, a top view layout of a portion of a chip 700 shows regions of logic 710 with sensors 720 interspersed. As can be seen, the general power network (of system voltage source line VDD_SOC and system first voltage line VSS_SOC) is separate from the power lines (VDD_Q, VSS_Q) of the independent power network. In some cases, the voltage source line or the first voltage line for the sensor is coupled to the system voltage source line or system first voltage line, respectively. In such cases, the other of the two lines coupled to the sensor can provide the quiet power supply from which power characteristics are detected.

In some cases, custom standard cells may be provided that contain sensor circuitry. The custom standard cells may be similar to the other available standard cells in the place and route software library, but support a different power line routing connection.

Sensors can be pre-placed as special macros in regular intervals over an area where protection is desired or placed after layout of the standard or cryptographic cells. In some cases, placeholder blocks (or even the custom cells for the sensors) may be distributed on a layer before regular standard cell placement is performed such that the regular circuitry placement becomes arranged around the desired density of sensors for a region.

An automatic place and route tool can determine an area of high protection for a circuit. In some cases, the area of high protection can be determined based on receiving input from a designer. In some cases, the area of high protection can be determined based on receiving results of circuit testing identifying areas of likely attack. In some cases, the area of high protection can be determined from a netlist indicating cryptographic blocks. A plurality of custom cells (providing components of the sensors) can be placed at positions in the chip. The number and density of the sensors can be selected for regions of the circuit according to whether the region is in the area of high protection. Density of the sensors can be based on available area and/or based on where preferred glitches are expected to occur. In addition, the density of the sensors in an area can be based on expected heat maps/scatter pattern/energy interference/voltage magnitude of where impact of an injection attack may be experienced.

The number and arrangement of sensors may be automatically calculated based on optimizations selected by the designer (e.g., preferences for area cost, expected attack types, etc.). In addition, optimizations can be included for determining types of sensors for a region. For example, areas of the chip with dense standard circuitry may utilize sensors with a smaller footprint. In some cases, the types of sensors may be selected and optimized based on anticipated types of attacks. For example, sensor components can be selected based on their responses to the two or more fault injection attack types.

In some cases, after placing the custom cells, the standard cells for the IC can then be automatically placed around the custom cells.

Sensors can also be placed in gaps (e.g., with reduced density) wherever possible in areas of low(er) protection desired to minimize the area overhead. Input and output of sensors can be connected in a chain or inputs can be driven by a fixed logic which could be integrated with a sensor.

The power lines (e.g., voltage source lines and first voltage lines) of the independent power network can be routed as special nets, for example during the automatic routing of the power lines. Automatic routing of the power lines can be performed where system power lines of a general power network are coupled to the standard cells and power lines of an independent power network are coupled to the custom cells. The automatic placement of power lines for the independent power network can create separate independent power networks that sensors implemented by the custom cells are coupled to. In addition, in some cases, the sensors of the separate independent power networks may have overlapping coverage of an area of the chip.

Any reference in this specification to "one embodiment," "an embodiment," "example embodiment," "an example", "some examples", etc., means that a particular feature, structure, or characteristic described in connection with the embodiment or example is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system, comprising:
   a circuit block coupled to a general power network;
   at least one independent power network comprising one or more power lines, wherein the at least one independent power network does not supply power to the circuit block,
      wherein the one or more power lines comprise a voltage source line, first voltage line, or both the voltage source line and the first voltage line,
      wherein the at least one independent power network comprises a quiet power source isolated from the general power network using a switch capacitor, wherein the quiet power source comprises the switched capacitor as a charge storage device that is selectively rechargeable by selective connection of the charge storage device to a system voltage source line and a system first voltage line; and wherein the charge storage device is coupled to the voltage source line, the first voltage line, or both the voltage source line and the first voltage line;
   a detector coupled to the at least one independent power network to detect a change in a power characteristic of the at least one independent power network; and
   sensors, each sensor being coupled to a power line of the one or more power lines of the at least one independent power network and located in an active layer of a chip with the circuit block, wherein the sensors are responsive to at least one type of fault injection attack.

2. The system of claim 1, wherein at least one sensor of the sensors is responsive to at least two types of fault injection attacks.

3. The system of claim 2, wherein the at least two types of fault injection attacks comprise at least two selected from the group consisting of electromagnetic fault injection, optical fault injection, and body bias injection.

4. The system of claim 1, wherein at least one sensor of the sensors comprises an inverter.

5. The system of claim 1, wherein the sensors comprise one or more transistors, diodes, capacitors, resistors, or combinations thereof.

6. The system of claim 1, wherein the detector comprises a current sensor.

7. The system of claim 1, wherein the circuit block comprises cryptographic block.

8. The system of claim 7, wherein the sensors are located in the active layer interspersed within the cryptographic block.

9. The system of claim 7, wherein the sensors are located in the active layer between sub-blocks of the cryptographic block.

10. The system of claim 1, wherein the at least one independent power network comprises a charge storage device.

11. The system of claim 1, wherein the at least one independent power network comprises at least two independent power networks, each independent power network having corresponding sensors coupled thereto that have overlapping areas of coverage.

12. The system of claim 1, wherein the quiet power source is connected to only supply power to the sensors and the detector.

\* \* \* \* \*